United States Patent
Matsuyuki et al.

(10) Patent No.: US 9,684,523 B2
(45) Date of Patent: *Jun. 20, 2017

(54) IN-VEHICLE INFORMATION SYSTEM, INFORMATION TERMINAL, AND APPLICATION EXECUTION METHOD

(71) Applicant: Clarion Co., Ltd., Chuo-ku, Saitama-shi, Saitama (JP)

(72) Inventors: Katsuya Matsuyuki, Saitama (JP); Noriyuki Abe, Yokohama (JP); Masafumi Naitou, Saitama (JP); Norikazu Nara, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 84 days.

This patent is subject to a terminal disclaimer.

(21) Appl. No.: 14/404,333

(22) PCT Filed: May 31, 2013

(86) PCT No.: PCT/JP2013/065221
§ 371 (c)(1),
(2) Date: Nov. 26, 2014

(87) PCT Pub. No.: WO2013/180280
PCT Pub. Date: Dec. 5, 2013

(65) Prior Publication Data
US 2015/0234665 A1    Aug. 20, 2015

(30) Foreign Application Priority Data
May 31, 2012   (JP) .................................. 2012-124543

(51) Int. Cl.
*G06F 9/445* (2006.01)
*B60R 11/02* (2006.01)
(Continued)

(52) U.S. Cl.
CPC .............. *G06F 9/445* (2013.01); *B60K 35/00* (2013.01); *B60K 37/06* (2013.01); *B60R 11/02* (2013.01); *B60K 2350/906* (2013.01)

(58) Field of Classification Search
CPC ..... B60K 2350/906; B60K 28/10; G06F 8/60; G06F 9/4443; H04M 1/72577
See application file for complete search history.

(56) References Cited

U.S. PATENT DOCUMENTS

| | | |
|---|---|---|
| 2008/0140381 A1 | 6/2008 | Koyasu et al. |
| 2010/0030424 A1 | 2/2010 | Kitagawa |
| 2013/0141227 A1 | 6/2013 | Murata et al. |

FOREIGN PATENT DOCUMENTS

| | | |
|---|---|---|
| CN | 1613051 A | 5/2005 |
| CN | 101559745 A | 10/2009 |

(Continued)

OTHER PUBLICATIONS

WO 2012023017A2 Marrunaka_machine translation.pdf, 2012.*
(Continued)

*Primary Examiner* — Jelani Smith
(74) *Attorney, Agent, or Firm* — Crowell & Moring LLP

(57) ABSTRACT

In an in-vehicle information system including a portable information terminal and an in-vehicle device, the information terminal includes: a storage unit that stores applications; a control unit that executes a start-up application; a running application determination unit that determines an application that is executed by the control unit by a predetermined time interval; a comparison unit that compares the start-up application and the running application; and a restriction information transmission unit that transmits to the in-vehicle device restriction information corresponding to contents of action regulation imposed on the running application while
(Continued)

a vehicle is in a traveling state based upon a result of the comparison by the comparison unit.

8 Claims, 8 Drawing Sheets

(51) Int. Cl.
*B60K 35/00* (2006.01)
*B60K 37/06* (2006.01)

(56) References Cited

FOREIGN PATENT DOCUMENTS

| CN | 101116055 B | 8/2010 | | | |
|---|---|---|---|---|---|
| EP | 2 101 305 A2 | 9/2009 | | | |
| EP | 2 617 604 A1 | 7/2013 | | | |
| JP | 2007-65893 A | 3/2007 | | | |
| JP | 2007-145225 A | 6/2007 | | | |
| JP | 2010-33459 A | 2/2010 | | | |
| JP | 2010033459 A | * | 2/2010 | | |
| JP | 2010-130670 A | 6/2010 | | | |
| JP | 2011147019 A | * | 7/2011 | | |
| JP | 2012-010287 A | 1/2012 | | | |
| JP | WO 2012023017 A2 | * | 2/2012 | ............ | B60K 28/10 |
| JP | 2012-43253 A | 3/2012 | | | |
| WO | WO 2012/036279 A1 | 3/2012 | | | |

OTHER PUBLICATIONS

JP 2010033459A_machine translation.pdf, 2010.*
JP2011147019A_Abstract-Solution.pdf, 2011.*
International Search Report (PCT/ISA/210) dated Aug. 13, 2013, with English translation (Three (3) pages).
European Search Report issued in counterpart European Application No. PCT/JP2013065221 dated Sep. 26, 2016 (five (5) pages).

* cited by examiner

IN-VEHICLE INFORMATION SYSTEM, INFORMATION TERMINAL, AND APPLICATION EXECUTION METHOD

TECHNICAL FIELD

The present invention relates to an in-vehicle information system, and an information terminal and an application execution method used in the in-vehicle information system.

BACKGROUND ART

There has been proposed in the related art to make it possible to bring into a vehicle a portable information terminal that is capable of executing various applications and of using it in the vehicle. In addition, there is known in the related art a technology that is configured such that in case a particular application, which is other than an application designed with safety in mind so that it can be executed even when the vehicle is traveling (i.e., safety-considered application), is executed while the vehicle is in a traveling state, use of the particular application is regulated by, for instance, outputting an alarm from an in-vehicle device or covering the portable information terminal with a lid to make it unseen (see Patent Literature 1).

CITATION LIST

Patent Literature

Patent Literature 1: Japanese Laid Open Patent Publication No. 2012-43253.

SUMMARY OF INVENTION

Technical Problem

According to the conventional art described in Patent Literature 1, when an application is executed at a portable information terminal, display of images and output of sounds depending on the application are performed by the information terminal but they are not performed by an in-vehicle device. Accordingly, in a case that a portable information terminal such as a portable phone or a smartphone is connected to the in-vehicle device and executes an application installed at the information terminal to output images and sounds from the in-vehicle device, use of the conventional technology cannot assure safety of driving.

Solution to Problem

An in-vehicle information system according to a first aspect of the present invention includes a portable information terminal and an in-vehicle device, and the information terminal includes: a storage unit that stores a plurality of applications; a control unit that has a launch function to start-up any one of the applications stored in the storage unit and executes the application started up by the launch function in the foreground; a running application determination unit that determines an application that is executed by the control unit by a predetermined time interval; a comparison unit that compares a start-up application that is started up by the launch function and a running application that is determined by the running application determination unit; and a restriction information transmission unit that transmits to the in-vehicle device restriction information corresponding to contents of action regulation imposed on the running application while a vehicle is in a traveling state based upon a result of the comparison by the comparison unit.

According to a second aspect of the present invention, in the in-vehicle information system of the first aspect, the information terminal may further include a regulatory information acquisition unit that obtains regulatory information indicating contents of action regulation imposed on each predetermined application while the vehicle is in a traveling state. It is preferred that the restriction information transmission unit transmits, before the comparison unit performs the comparison, to the in-vehicle device the restriction information corresponding to the contents of the action regulation imposed on the start-up application while the vehicle is in a traveling state based on the regulatory information, and transmits, after the comparison unit performs the comparison, to the in-vehicle device the restriction information corresponding to the contents of the action regulation imposed on the running application while the vehicle is in a traveling state based upon the result of the comparison.

According to a third aspect of the present invention, the in-vehicle information system of the second aspect may further include a decision-making unit that makes a decision as to whether or not the start-up application and the running application are identical with each other. In this in-vehicle information system, it is preferred that, if it is decided by the decision-making unit that the start-up application and the running application are not identical with each other, the restriction information transmission unit transmits, to the in-vehicle device, predetermined default restriction information as the restriction information corresponding to the contents of the action regulation imposed on the running application while the vehicle is in a traveling state.

According to a fourth aspect of the present invention, in the in-vehicle information system of the third aspect, it is preferred that, if it is decided by the decision-making unit that the start-up application and the running application are identical with each other, the restriction information transmission unit transmits, to the in-vehicle device, the same restriction information as that which was transmitted before the comparison was made by the comparison unit again or the restriction information transmission unit does not transmit the restriction information.

According to a fifth aspect of the present invention, in the in-vehicle information system of any one of the first through fourth aspects, the information terminal may further include an image output unit that outputs an image corresponding to the application being executed by the control unit in the foreground to the in-vehicle device. In addition, the in-vehicle device may further include: a display unit that displays the image output from the information terminal; an operation input unit that inputs an operation by a user; and an operation information transmission unit that transmits to the information terminal operation information corresponding to the operation inputted through the operation input unit. In this in-vehicle information system, it is preferred that, based upon the restriction information transmitted from the information terminal by the restriction information transmission unit, the in-vehicle device allows or disallows the display of the image by the display unit and the transmission of the operation information by the operation information transmission unit respectively.

According to a sixth aspect of the present invention, in the in-vehicle information system of any one of the first through fifth aspects, the control unit may realize the launch function by executing a first sub-application having the launch function.

According to a seventh aspect of the present invention, in the in-vehicle information system of the sixth aspect, it is preferred that the control unit, along with executing the first sub-application in the foreground, executes in the background a second sub-application having an action regulation function for performing the comparison by the comparison unit and a communication function for transmitting the restriction information by the restriction information transmission unit to the in-vehicle device.

An information terminal according to an eighth aspect of the present invention includes: a storage unit that stores a plurality of applications; a control unit that has a launch function to start-up any one of the applications stored in the storage unit and executes the application started up by the launch function in the foreground; a running application determination unit that determines an application that is executed by the control unit by a predetermined time interval; a comparison unit that compares a start-up application that is started up by the launch function and a running application that is determined by the running application determination unit; and a restriction information transmission unit that transmits to the in-vehicle device restriction information corresponding to contents of action regulation imposed on the running application while a vehicle is in a traveling state based upon a result of the comparison by the comparison unit.

A method of executing an application according to a ninth aspect of the present invention, which uses an in-vehicle information system including a portable information terminal and an in-vehicle device, includes: storing in advance a plurality of applications at the information terminal; determining a running application being executed at the information terminal by a predetermined time interval; making a comparison between a start-up application that is started up by a predetermined launch function at the information terminal and the determined running application; and transmitting, based upon a result of the comparison, restriction information corresponding to contents of action regulation imposed on the running application while a vehicle is in a traveling state from the information terminal to the in-vehicle device.

Advantageous Effect of the Invention

According to the present invention, when a portable information terminal is connected to an in-vehicle device while a vehicle is in a traveling state and an application installed at the information terminal is executed to output images and sounds from the in-vehicle device, safety of driving can be assured.

DESCRIPTION OF EMBODIMENTS

Figure 1:
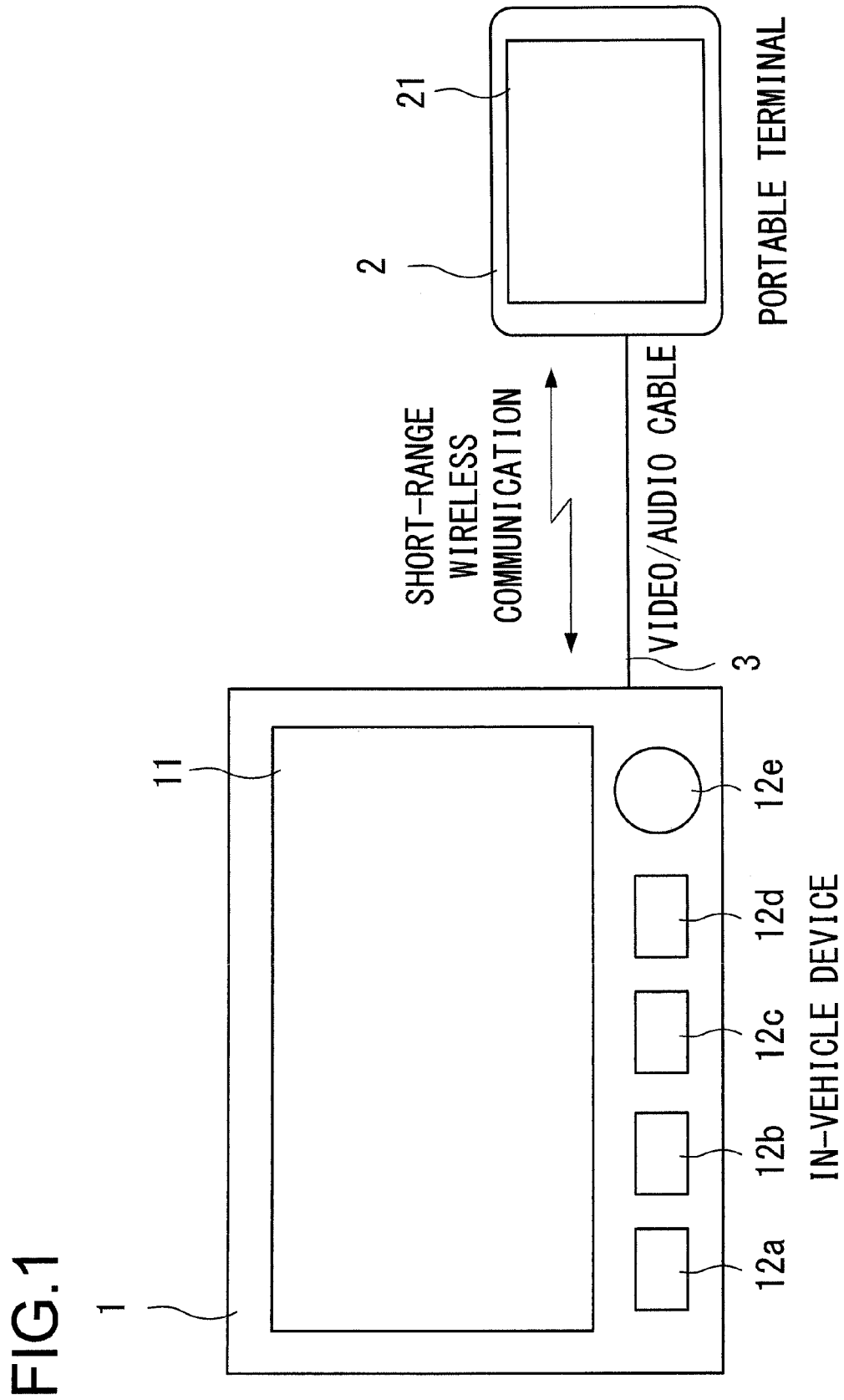
FIG. 1 A diagram showing the configuration of the in-vehicle information system achieved in an embodiment of the present invention.

FIG. 1 shows the configuration of the in-vehicle information system achieved in an embodiment of the present invention. The in-vehicle information system in FIG. 1, which is used as an onboard system installed in a vehicle, is configured by connecting an in-vehicle device 1 with a portable terminal 2 through short-range wireless communication and through wired communication enabled via a video/audio cable 3. The in-vehicle device 1 is installed at a fixed position within the vehicle, at, for instance, the instrument panel in the vehicle. The portable terminal 2 is a portable information terminal that can be carried by the user, such as a portable telephone or a smart phone. It is to be noted that short-range wireless communication between the in-vehicle device 1 and the portable terminal 2 may be carried out in compliance with, for instance, the Bluetooth standard. In addition, the wired communication via the video/audio cable 3 may be achieved in compliance with, for instance, the HDMI (high definition multimedia interface) standard.

A display unit 11 and operation keys (operation switches) 12*a*, 12*b*, 12*c*, 12*d* and 12*e* are disposed at the in-vehicle device 1. The display unit 11 is a display monitor at which various types of still images and video can be displayed, and may be constituted with, for instance, a liquid crystal display unit. The operation keys 12*a* through 12*e* are operation switches via which user input operations are detected and are assigned with various functions in correspondence to the processing currently underway in the in-vehicle device 1. The user operates a specific operation key among the operation keys 12*a* through 12*e* to engage the in-vehicle device 1 in execution of a desired function. It is to be noted that while the example presented in FIG. 1 includes the operation keys 12*a* through 12*d* constituted as pushbutton-type switches and the operation key 12*e* constituted as a dial-type switch that can be rotated to the left and to the right, the present invention is not limited to this example and may be adopted in conjunction with operation keys disposed with a different positional arrangement, operation keys adopting different structures, operation keys provided in a different quantity or the like. In addition, the display unit 11 may be constituted as a touch panel-type display monitor and such a display unit 11 may include only some of the operation keys or it may dispense with all the operation keys.

A display unit 21 is disposed at the portable terminal 2. The display unit 21 is a touch panel-type display monitor at which various types of still images and video can be displayed and it may be configured by combining, for instance, a touch sensor capable of detecting a position at which it has been touched and a liquid crystal display unit. The user is able to cause the portable terminal 2 to execute a desired function by touching a given position on the display unit 21 with his finger or the like, in correspondence to the content of an image or video on display at the display unit 21. It is to be noted that while the display unit 21 in this example is constituted with a touch panel-type display monitor, the present invention may be adopted in conjunction with a standard display monitor instead of a touch panel-type display monitor. In such a case, it is desirable that the portable terminal 2 include various types of operation switches corresponding to specific contents or details of processing executed by the portable terminal 2. As an alternative, the present invention may be adopted in conjunction with a display unit 21 constituted with a touch panel-type display monitor in an portable terminal 2 that also includes operation switches, each corresponding to a specific operation.

Figure 2:
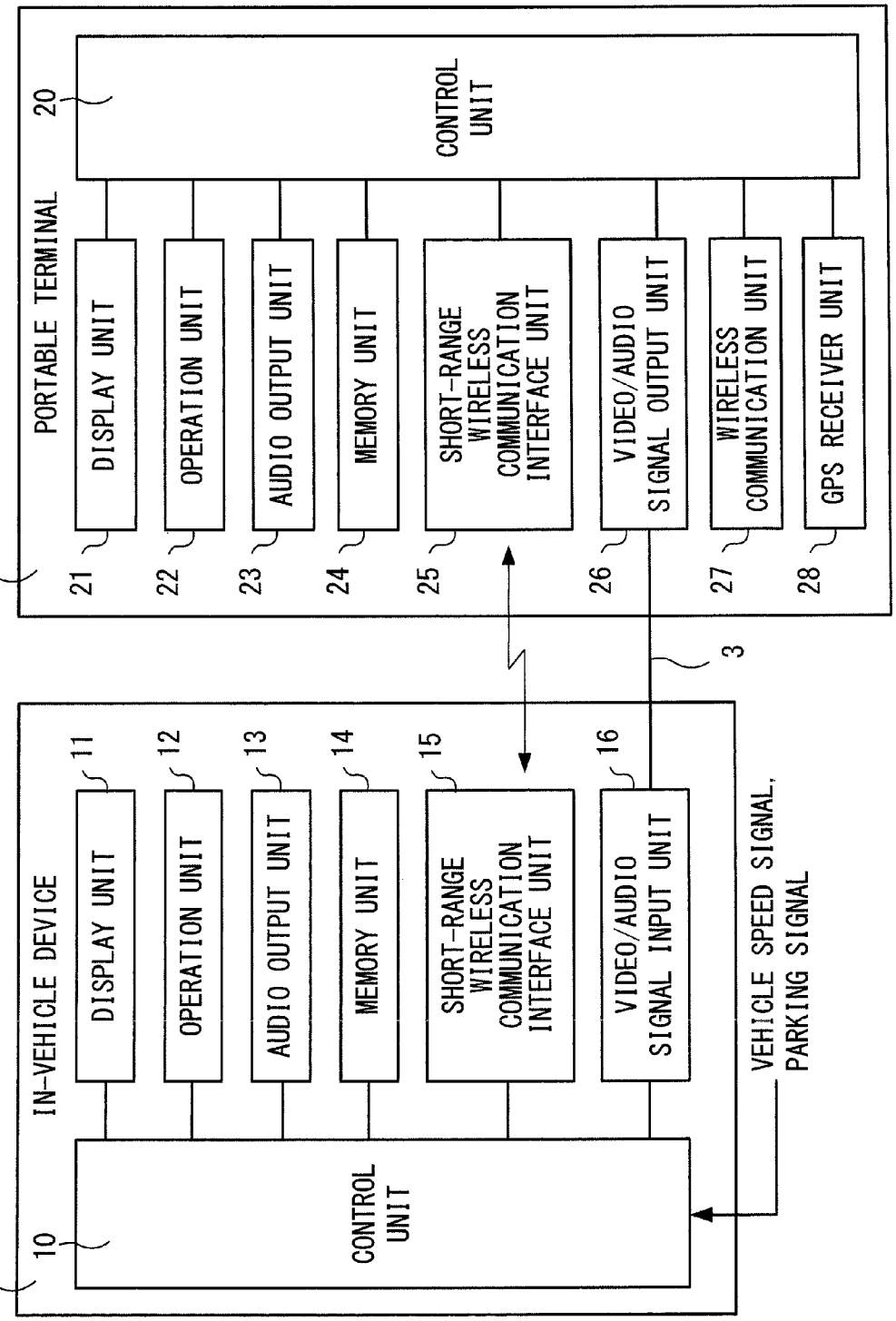
FIG. 2 A block diagram showing the structures adopted in the in-vehicle device and the portable terminal.

FIG. 2 is a block diagram showing the structures of the in-vehicle device 1 and the portable terminal 2. As shown in FIG. 2, the in-vehicle device 1 includes a control unit 10, the display unit 11, an operation unit 12, an audio output unit 13, a memory unit 14, a short-range wireless communication interface unit 15 and a video/audio signal input unit 16. The portable terminal 2 includes a control unit 20, the display unit 21, an operation unit 22, an audio output unit 23, a memory unit 24, a short-range wireless communication interface unit 25, a video/audio signal output unit 26, a wireless communication unit 27 and a GPS (global positioning system) receiver unit 28.

The control unit 10 in the in-vehicle device 1, which is constituted with a microprocessor, various peripheral circuits, a RAM, a ROM and the like, executes various types of processing based upon a control program recorded in the memory unit 14. Various types of image display processing, audio output processing and the like are enabled through processing executed by the control unit 10.

In addition, the control unit 10 obtains a vehicle speed signal and a parking signal output from the vehicle. The control unit 10 determines whether the vehicle is currently in a traveling state or in a stationary state based upon the vehicle speed signal and the parking signal. It is to be noted that the vehicle speed signal and the parking signal may be provided from the vehicle to the control unit 10 in the form of a vehicle speed pulse output via a CAN (controller area network) configuring an onboard communication network, from a vehicle speed sensor installed in the vehicle.

As has been explained in reference to FIG. 1, the display unit 11 is a display monitor constituted with a liquid crystal display unit or the like. The operation unit 12 is a switch via which a user input operation is detected and it may be configured with, for instance, the operation keys 12a through 12e shown in FIG. 1. It is to be noted that the display unit 11 may instead be constituted as a touch panel-type display monitor, as explained earlier, and in such a case, the display unit 11 and the operation unit 12 may be integrated into a single structural element. The contents of an input operation performed by the user at the operation unit 12 are output to the control unit 10 and are reflected in the processing executed by the control unit 10.

The audio output unit 13, which includes an amplifier, a speaker and the like, is capable of outputting various types of sound under control executed by the control unit 10. For instance, music played back by reproducing music data read out from the portable terminal 2 or a recording medium (not shown), audio guidance used to guide the vehicle to a destination, or the like can be output from the audio output unit 13.

The memory unit 14, which is a non-volatile data storage device, may be constituted with an HDD (hard disk drive), a flash memory or the like. Various types of data, including the control program used by the control unit 10, as explained earlier, are stored in the memory unit 14. Data are read out from the memory unit 14 and written into the memory unit 14 as needed under control executed by the control unit 10.

The short-range wireless communication interface unit 15 executes, under control executed by the control unit 10, wireless interface processing required to enable short-range wireless communication with the portable terminal 2. For instance, it converts information output from the control unit 10 to a wireless signal in a predetermined signal format and transmits the wireless signal to the portable terminal 2. It also receives information output from the portable terminal 2 as a wireless signal in a predetermined signal format and outputs the received wireless signal information to the control unit 10. The short-range wireless communication interface unit 15 executes such interface processing in compliance with a specific communication standard such as Bluetooth.

The video/audio signal input unit 16 converts a video signal and an audio signal input from the portable terminal 2 via the video/audio cable 3 to image data for screen display and audio data for audio output respectively and outputs the video data and the audio data to the control unit 10. The control unit 10, having obtained the video data and the audio data output from the video/audio signal input unit 16, controls the display unit 11 so as to bring up on display at the display unit 11 a screen image based upon the video data and also enables the audio output unit 13 to output sound based upon the audio data by controlling the audio output unit 13.

On the other hand, the control unit 20 in the portable terminal 2 is constituted with a microprocessor, various peripheral circuits, a RAM, a ROM and the like, as is the control unit 10 in the in-vehicle device 1, and executes various types of processing based upon a control program recorded in the memory unit 24.

As explained earlier, the display unit 21 is a touch panel-type display monitor. The operation unit 22 is used for purposes of user input operation detection. It is to be noted that while the display unit 21 and the operation unit 22 are shown as separate structural elements in FIG. 2, the operation unit 22 is, in fact, constituted as an integrated part of the touch panel-type display unit 21. In the alternative configuration described earlier, which includes operation switches disposed at the portable terminal 2, the operation switches correspond to the operation unit 22. Details of a user input operation performed at the operation unit 22 are output to the control unit 20 and are reflected in the processing executed by the control unit 20.

The audio output unit 23, which includes an amplifier, a speaker and the like, is capable of outputting various types of sound under control executed by the control unit 20. During a phone conversation carried out via the portable terminal 2, for instance, the voice of the other party is output from the audio output unit 23.

In the memory unit 24, which is a non-volatile data storage device similar to the memory unit 14 in the in-vehicle device 1, various types of data to be used in the processing executed by the control unit 20 are stored. Various application programs (hereafter simply referred to as applications), acquired by the user in advance, are also stored in the memory unit 24. The user is able to select a specific application among the various applications stored in the memory unit 24 and have it executed by the control unit 20. In this manner, various functions can be fulfilled in the portable terminal 2.

As does the short-range wireless communication interface unit 15 in the in-vehicle device 1, the short-range wireless communication interface unit 25 executes wireless interface processing in compliance with the predetermined communication standard. Namely, information communication between the in-vehicle device 1 and the portable terminal 2 is achieved as the short-range wireless communication interface unit 15 and the short-range wireless communication interface unit 25 exchange information with each other through wireless communication.

The video/audio signal output unit 26 converts an image (video image) and sound generated by the control unit 20 to a video signal and an audio signal in compliance with a predetermined communication standard such as HDMI and outputs the signals resulting from the conversion to the in-vehicle device 1 via the video/audio cable 3. As the video signal and the audio signal are input at the video/audio signal input unit 16 in the in-vehicle device 1, a screen image identical to that brought up on display at the display unit 21 in the portable terminal 2 is brought up on display at the display unit 11 in the in-vehicle device 1 and sound identical to that output from the audio output unit 23 in the portable terminal 2 is also output from the audio output unit 13 in the in-vehicle device 1. The term "video mirroring" is often used to refer to this function.

The wireless communication unit 27 performs wireless communication to connect the portable terminal 2 with another portable terminal or a server via a wireless communication network (not shown). Through the wireless communication carried out via the wireless communication unit 27, the portable terminal 2 is able to perform a telephone conversation with another portable terminal, download a desired application from a server, and the like. It is to be noted that the wireless communication network enabling wireless communication carried out via the wireless communication unit 27 may be, for instance, a portable telephone network or the Internet, connection with which can be established via a wireless LAN.

The GPS receiver unit 28 receives GPS signals transmitted from GPS satellites and outputs the GPS signals thus received to the control unit 20. Each GPS signal carries, as information that can be used to determine the current position of the portable terminal 2 and the current time, information indicating the position of the GPS satellite having transmitted the particular GPS signal and the transmission time point. Thus, the current position and the current time can be calculated in the control unit 20 based upon information carried in GPS signals received from equal to or more than a predetermined minimum number of GPS satellites.

Next, a coordinated function achieved by the in-vehicle device 1 and the portable terminal 2 in this in-vehicle information system will be described. A coordinated function achieved by the in-vehicle device 1 and the portable terminal 2 is available in the in-vehicle information system. When the coordinated function is in effect, an image and sound corresponding to a specific application among the various applications, executed at the portable terminal 2 connected with the in-vehicle device 1 can be displayed and output at the in-vehicle device 1. In addition, contents of a user operation performed at the in-vehicle device 1 can be reflected in the operation of the application being executed at the portable terminal 2.

For instance, navigation processing may be executed so as to guide the vehicle to a destination by executing a navigation application at the portable terminal 2. In the navigation processing, a map screen image with a map of an area around of the current position drawn therein is created at the portable terminal 2 and a video signal corresponding to the map screen image is output to the video/audio signal input unit 16 from the video/audio signal output unit 26 via the video/audio cable 3. Through this processing, the map screen image is transmitted from the portable terminal 2 to the in-vehicle device 1 so as to bring up the map screen image of the area around the current position at the display unit 11 in the in-vehicle device 1. In addition, as the user sets a destination through a user operation performed at the operation unit 12 in the in-vehicle device 1 or at the operation unit 22 in the portable terminal 2, a search for a recommended route from the current vehicle position designated as a departure point to the destination having been set is executed at the portable terminal 2. As the vehicle approaches a guidance requiring point on the recommended route, audio guidance data indicating the direction along which the vehicle is to advance at the particular guidance requiring point are transmitted from the portable terminal 2 to the in-vehicle device 1. As a result, audio guidance can be output from the audio output unit 13 in the in-vehicle device 1. It is to be noted that specific signals may be output from the portable terminal 2 to the in-vehicle device 1, each in correspondence to the timing of the audio guidance data output start and the timing of the audio guidance data output end. Through these measures, it can be ensured that the user will be able to hear the audio guidance clearly, even if other audio data are being output via the radio, the CD player or the like in the in-vehicle device 1, by lowering the sound volume for the other audio output during the audio guidance output. As described above, the in-vehicle device 1 provides the user with guidance information so that the user is able to drive the vehicle to the destination without getting lost by displaying a map image at the display unit 11 and outputting audio guidance via the audio output unit 13.

It is to be noted that various types of data including map data needed by the portable terminal 2 when executing the navigation application may be stored in advance in the memory unit 24 in the portable terminal 2. As an alternative, only data that are absolutely necessary may be stored in the memory unit 24 and in such a case, the portable terminal 2 should be able to connect with a specific server via the wireless communication unit 27 in order to obtain necessary additional data each time it executes the navigation application.

At the portable terminal 2, an application selected by the user, among the plurality of applications including a navigation application such as that described above, is executed. The user is able to select a desired application he wishes to be executed at the portable terminal 2 by operating the operation unit 22 in a menu screen on display at the display unit 21 in the portable terminal 2. In the menu screen, for instance, icons that represent applications for which a coordinated function is available are brought up on display in juxtaposition. When the user selects any one of the icons by operating a touch panel or the like in the menu screen, an application in correspondence to the selected icon is executed at the portable terminal 2.

In addition, the portable terminal 2 transmits a menu screen image in the form of a video signal provided from the video/audio signal output unit 26, to the in-vehicle device 1. Based upon the video signal transmitted from the portable terminal 2, the in-vehicle device 1 brings up the menu screen on display at the display unit 11. As the user operates the operation unit 12 so as to select a desired application in this menu screen, operation information corresponding to the operational contents of the user operation is transmitted via the short-range wireless communication interface unit 15 from the in-vehicle device 1 to the portable terminal 2. It is to be noted that the operation information output from the in-vehicle device 1 may be, for instance, button information indicating contents of a button operation performed by the user or coordinate information indicating the position on the screen at the display unit 11 specified through a touch panel operation.

The operation information transmitted from the in-vehicle device 1 as described above is received at the short-range wireless communication interface unit 25 in the portable terminal 2 and the operation information thus received is then output to the control unit 20. Based upon the operation information received as described above, the control unit 20 identifies the application selected by the user at the in-vehicle device 1 and executes the selected application. Through this process, the user is able to select a desired application in the menu screen on display at the in-vehicle device 1, just as he is able to select a desired application in the menu screen brought up on display at the display unit 21 at the portable terminal 2, and have the selected application executed in the portable terminal 2.

It is to be noted that the control unit 20 is able to execute each application either in the foreground or in the background. Any application being executed in the foreground is designated as a subject application for image display and operation input both at the in-vehicle device 1 and at the portable terminal 2. While the control unit 20 does execute the corresponding processing for an application running in the background, the application is not a subject application for image display or operation input at the in-vehicle device 1 or the portable terminal 2. However, sound originating from the application being executed in the background may be output.

In order to enable a coordinated function such as that described above achieved by connecting the in-vehicle device 1 to the portable terminal 2, an application referred to as an application manager is installed in advance and stored in the memory unit 24 at the portable terminal 2. Namely, a plurality of applications including the application manager is stored in the memory unit 24. As the portable terminal 2 becomes connected to the in-vehicle device 1, the application manager is read out from the memory unit 24 and is executed by the control unit 20.

Figure 3:
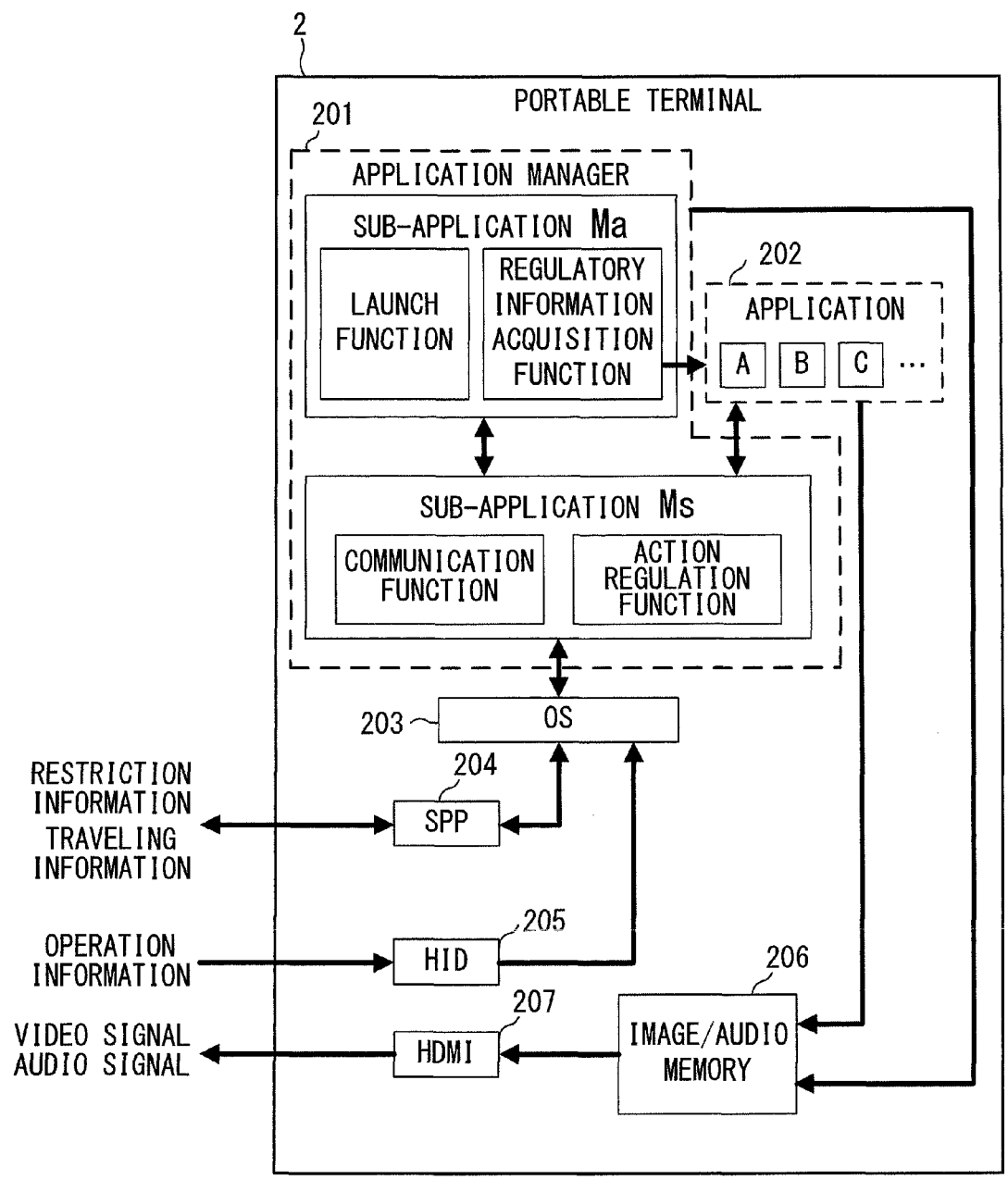
FIG. 3 A schematic diagram illustrating the software structure adopted in the portable terminal.

FIG. 3 is a diagram schematically illustrating the software structure adopted in the portable terminal 2. An application manager 201 in FIG. 3 includes a sub-application Ma and a sub-application Ms.

The sub-application Ma has a launch function for starting up applications other than the application manager 201 itself and a regulatory information acquisition function for obtaining regulatory information for each application. The control unit 20 is able to use these functions by executing the sub-application Ma in the foreground. For instance, the launch function is used to call up another application and have that application executed in the foreground by the control unit 20, instead of the sub-application Ma. In addition, the regulatory information acquisition function is used to obtain the regulatory information indicating contents of action regulation to be imposed on each application among the plurality of applications stored in the memory unit 24 while the vehicle is in a traveling state from the memory unit 24, an external server or the like.

The sub-application Ms has a communication function to be engaged when connecting the portable terminal 2 to the in-vehicle device 1 and an action regulation function for imposing action regulation while the vehicle is in the traveling state. The control unit 20 is able to use these functions by executing the sub-application Ms in the background. For instance, the communication function enables execution of communication processing so as to allow the information terminal 2 and the in-vehicle device 1 to exchange information needed for coordinated operations. In addition, the action regulation function is used to determine the contents of the action regulation to be imposed on the application being executed in the foreground while the vehicle is in a traveling state by referencing the regulatory information obtained through the regulatory information acquisition function of the sub-application Ma described earlier. Restriction information indicating the determination results is transmitted from the portable terminal 2 to the in-vehicle device 1 through the communication function and is utilized in the in-vehicle device 1 when imposing action restriction while the vehicle is in a traveling state.

As explained above, the application manager 201 is configured with two separate sub-applications, i.e., the sub-application Ma executed by the control unit 20 in the foreground and the sub-application Ms executed by the control unit 20 in the background. By adopting this structure, optimization of function assignments within the application manager 201 is achieved so as to assign functions best suited for foreground execution as foreground functions and assign functions best suited for background execution as background functions. It is to be noted that an application that is executed always in the background such as the sub-application Ms is sometimes referred to as a daemon or a service.

The application manager 201 calls up a given application among various applications 202 through the launch function of the sub-application Ma. The application thus called up is then executed by the control unit 20 in the foreground instead of the sub-application Ma. It is to be noted that the following description will be given in reference to FIG. 3 by assuming that application A is being executed.

An OS (operating system) 203 is a software program used to manage the overall operations of the portable terminal 2. When the portable terminal 2 is connected to the in-vehicle device 1, the OS 203 acts as a go-between for information output from the sub-application Ms executed by the control unit 20 in the background and input to an SPP (Serial Port Profile) 204 and an HID (Human Interface Device) profile 205 and vice versa. The SPP 204 and the HID profile 205 are drivers used in short-range wireless communication carried out between the in-vehicle device 1 and the portable terminal 2. These drivers are standardized as part of the standard used in compliance with Bluetooth.

The SPP 204 executes processing for transmitting the restriction information indicating the results of the determination made with regard to the action regulation contents through the action regulation function of the sub-application Ms, and processing for receiving traveling information transmitted from the in-vehicle device 1 based upon the vehicle traveling state. The HID profile 205 executes processing for receiving operation information output in correspondence to contents of the user operation performed at the in-vehicle device 1. The contents of the various types of information received by the SPP 204 and the HID profile 205 are output to the sub-application Ms via the OS 203 and are then transferred to the application, the execution of which is underway, through the communication function of the sub-application Ms. It is to be noted that the transmission/reception of the various types of information is enabled through wireless communication carried out by the short-range wireless communication interface unit 15 at the in-vehicle device 1 and the short-range wireless communication interface unit 25 at the portable terminal 2.

When the sub-application Ma is currently executed in the foreground by the control unit 20, the sub-application Ma generates a menu screen image that will allow the user to select an application he wishes to have executed by the launch function explained earlier. If, on the other hand, an application A is currently being executed in the foreground by the control unit 20, the application A generates a specific image and sound by utilizing, as needed, the traveling information or the operation information transferred from the sub-application Ms. The image and the sound are then stored into an image/audio memory 206 on a temporary basis, before they are output to an HDMI driver 207.

The HDMI driver 207 executes processing for converting an image and sound generated by the sub-application Ma, application A or the like to a video signal and an audio signal through a method in compliance with the HDMI standard. The video signal and the audio signal resulting from the conversion are then output by the video/audio signal output unit 26 to in-vehicle device 1 via the video/audio cable 3.

The portable terminal 2 has a software structure as described above. It is to be noted that the software structure may be achieved by using, for instance, the Android operating system. In the software configured in the Android operating system, the sub-application Ma will be executed in the "Activity" thread and the sub-application Ma will be executed in the "Service" thread so as to enable execution of the sub-application Ma in the foreground by the control unit 20 concurrently with the sub-application Ms, being executed in the background.

Next, action restriction for applications while the vehicle is in a traveling state will be described. The applications that can be executed at the portable terminal 2 include applications that might distract the driver's attention and thus affect driving safety if image display or user operation input at the in-vehicle device 1, enabled through a coordinated function such as that described earlier, was allowed while the vehicle was in a traveling state. Accordingly, it is desirable that even if such an application is executed at the portable terminal 2 while the vehicle is traveling, restrictions be imposed on the display of an image at the in-vehicle device 1 or a user operation input at the in-vehicle device 1. For the purpose of realizing such restrictions, action restriction for applications while the vehicle is in a traveling state is performed through the method described below at the in-vehicle device 1 and the portable terminal 2.

Figure 4:
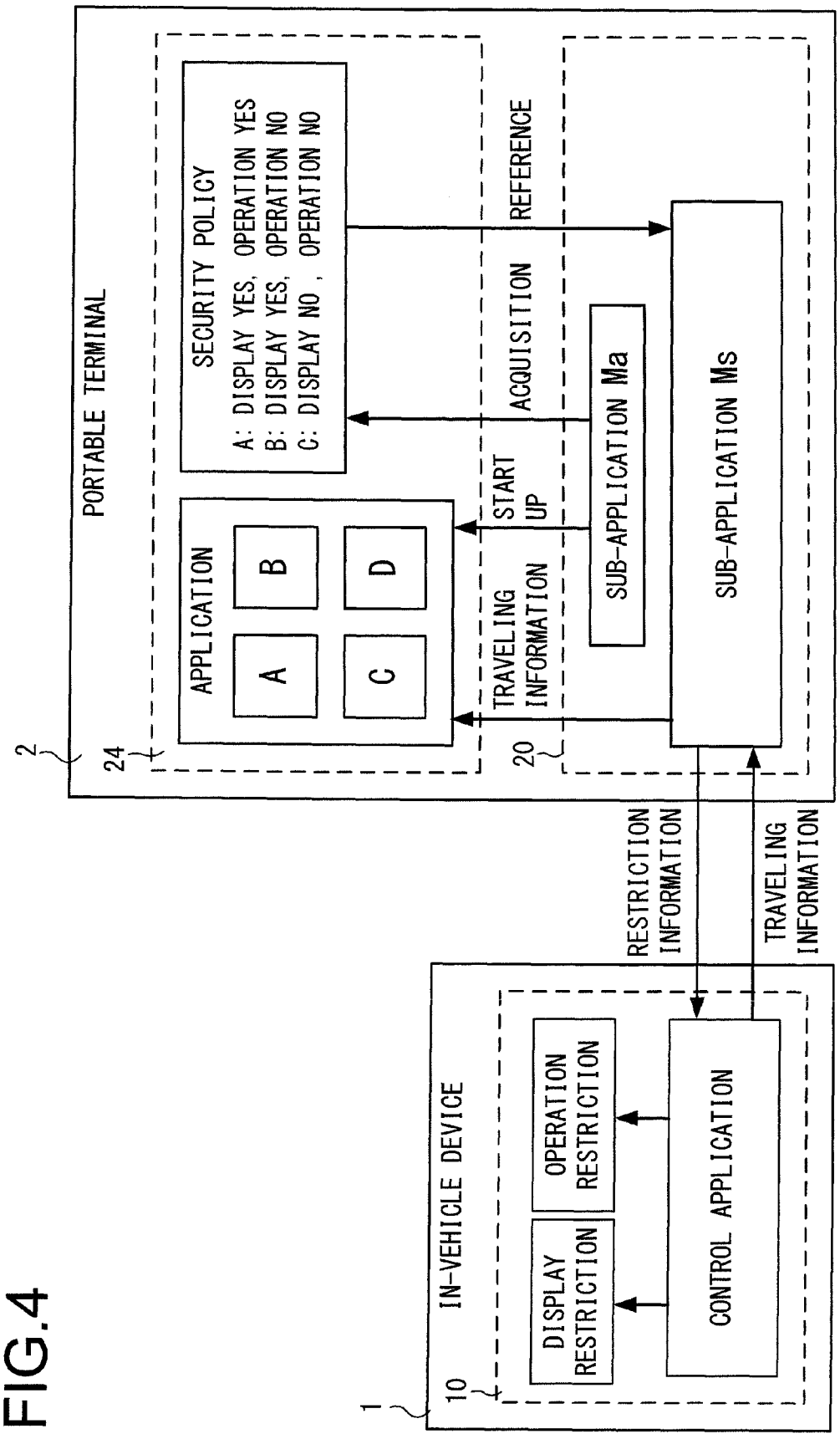
FIG. 4 A conceptual diagram illustrating action restriction for applications while the vehicle is in a traveling state.

FIG. 4 is a conceptual diagram illustrating action restriction for applications while the vehicle is traveling. The following description of action restriction for applications while the vehicle is traveling will be given by assuming that four different types of preinstalled applications A, B, C and D, are stored in the memory unit 24 at the portable terminal 2, as illustrated in FIG. 4, and that one of these applications is selected and executed in response to a user operation.

As a connection between the in-vehicle device 1 and the portable terminal 2 is established, the control unit 20 starts up the sub-application Ma and executes it in the foreground. It then obtains the regulatory information indicating the contents of the action regulation to be imposed in correspondence to each application while the vehicle is in a traveling state from a specific source, such as a server connected via a wireless communication network, by using the regulatory information acquisition function of the sub-application Ma. The regulatory information thus obtained is stored into the memory unit 24.

The following description will be given by assuming that a security policy such as that shown in FIG. 4 has been obtained as the regulatory information. The security policy in the example allows both image display and user operation input in correspondence to application A, allows image display but disallows user operation input in correspondence to application B and disallows both image display and user operation input in correspondence to application C. It is to be noted that no regulatory information is recorded in the security policy for application D in the example presented in FIG. 4.

As one of the applications A through D is selected at the portable terminal 2 in response to a user operation, the control unit 20 reads out the selected application from the memory unit 24 and starts it up by using the launch function of the sub-application Ma. Then, it starts executing the application in the foreground in place of the sub-application Ma, which has been running in the foreground.

Once any particular one of the applications A through D is started up as described above, the control unit 20 causes the sub-application Ma to provide a notification notifying which is that particular one of the applications (referred to as start-up application) to the sub-application Ms, which is executed at all times in the background. Upon receipt of the notification by the sub-application Ms, the control unit 20 can identify the application having been started up by using the action regulation function of the sub-application Ms. Then, it references the security policy stored in the memory unit 24 so as to determine the contents of the action regulation to be imposed on the particular application while the vehicle is in a traveling state.

For instance, if application A has been started up, the control unit 20 determines the contents of the action regulation to be imposed on application A while the vehicle is in a traveling state by referencing the part of the security policy corresponding to application A. Namely, it determines that both image display and user operation input are allowed in correspondence to application A even while the vehicle is in a traveling state.

If, on the other hand, application B has been started up, the control unit 20 determines the contents of the action regulation to be imposed on application B while the vehicle is in a traveling state by referencing the part of the security policy corresponding to application B. Namely, it determines that the image display is allowed but user operation input is disallowed in correspondence to application B while the vehicle is in a traveling state.

In addition, if application C has been started up, the control unit 20 determines the contents of the action regulation to be imposed on application C while the vehicle is in a traveling state by referencing the part of the security policy corresponding to application C. Namely, it determines that both image display and user operation input are disallowed in correspondence to application C while the vehicle is in a traveling state.

It is to be noted that if application D has been started up in the control unit 20, no information can be referenced since the security policy does not include any part corresponding to application D. Under such circumstances, it is desirable to determine that both the image display and the user operation input are to be disallowed, as in the case of application C. Through these measures, even when an application not covered by the security policy is being executed, driver distraction will be prevented and safe driving will be assured.

Upon starting up and executing any particular application, the control unit 20 determines the contents of the action regulation to be imposed while the vehicle is in a traveling state in correspondence to the application currently being executed, as described above. And, the control unit 20 transmits the restriction information corresponding to the determination results to the in-vehicle device 1 by using the communication function of the sub-application Ms. The restriction information is transmitted via the short-range wireless communication interface unit 25.

At the in-vehicle device 1, the restriction information having been transmitted from the portable terminal 2 is received via the short-range wireless communication interface unit 15, by a control application being executed in the control unit 10. Then, based upon the restriction information having been received, the contents of the action regulation to be imposed while the vehicle is in a traveling state for the application being executed at the portable terminal 2 are determined and if the vehicle is currently in a traveling state, a display restriction or an operation restriction is imposed in correspondence to the contents of the action regulation.

For instance, if application A is currently being executed at the portable terminal 2, the display of an image originating from the portable terminal 2 and user operation input are both allowed even while the vehicle is in a traveling state, without imposing any display or operation restriction. Namely, the image corresponding to the application A originating from the portable terminal 2 is output to the display unit 11 and is thus brought up on display at the display unit 11, and the operation information corresponding to the user operation input performed at the operation unit 12 is transmitted from the short-range wireless communication interface unit 15.

If, on the other hand, application B is currently being executed at the portable terminal 2, the display of an image originating from the portable terminal 2 is allowed but user operation input is disallowed while the vehicle is in a traveling state by imposing the operation restriction alone. Namely, the image corresponding to application B originating from the portable terminal 2 is output to the display unit 11 and is thus brought up on display at the display unit 11, but transmission of the operation information via the short-range wireless communication interface unit 15 is disallowed.

In addition, if application C or application D is currently being executed at the portable terminal 2, the display of an image originating from the portable terminal 2 and user operation input are both disallowed while the vehicle is in a traveling state by imposing both the display restriction and the operation restriction. Namely, the image display at the display unit 11 is disallowed and the transmission of the operation information via the short-range wireless communication interface unit 15 is also disallowed.

Incidentally, the portable terminal 2, after having started up an application by using a launch function, can display a menu screen image other than the launch function, using the OS 203 and start-up and execute another application on the menu screen. In this manner, when a particular application other than the application that has been started up through the launch function is being executed, the control unit 20 determines by using the action regulation function of the sub-application Ms that the particular application has not been started up through the launch function that is a regular start-up procedure. Then, the control unit 20 disallows coordinated operations with the in-vehicle device 1 regardless of the contents of the security policy imposed on the particular application. This is realized by the following processing.

After an application is started, the control unit 20 makes an inquiry at the OS 203 about which application is currently being executed at regular intervals. When a specific application being currently executed (hereafter, referred to as "running application") is notified by the OS 203 in response to the inquiry, the control unit 20 compares the running application with the application having been started that is lastly notified by the sub-application Ma. As a result, if these applications are identical with each other, the control unit 20 determines that the application having been started up by a regular start-up procedure is being executed.

On the other hand, if the lastly notified application that has been started up differs from the running application, the control unit 20 determines that the running application has not been started up by the regular start-up procedure. Then, with regard to image display by the running application and the operation input by the user, the control unit 20 transmits restriction information similar to that for the application C or D described above to the in-vehicle device 1 by using the communication function of the sub-application Ms so that the image display by the running application and the operation input by the user at the in-vehicle device 1 while the vehicle is in a traveling state are disallowed. The transmission of the restriction information is performed via the short-range wireless communication interface unit 25 as described above.

Similarly to the starting up of the application described above, the in-vehicle device 1 receives the restriction information transmitted from the portable terminal 2 through the short-range wireless communication interface unit 15 by the control application executed at the control unit 10. According to the restriction information having been received, then, based upon the restriction information having been received, the in-vehicle device 1 determines the contents of action regulation while the vehicle is in a traveling state and a display restriction or an operation restriction is imposed in correspondence to the contents of the action regulation if it is determined that the vehicle is in a traveling state. Namely, the display unit 11 is disallowed to display images and the short-range wireless communication interface unit 15 is disallowed to transmit the operation information. In this manner, coordinated operations of the in-vehicle device 1 and the portable terminal 2 are disallowed.

In addition, the control application being executed by the control unit 10 at the in-vehicle device 1 determines, based upon the vehicle speed signal and the parking signal output from the vehicle, whether the vehicle is currently in a traveling state or in a stationary state. If it detects any change in the vehicle traveling condition indicated in the determination results, it outputs traveling information indicating the new traveling condition to the portable terminal 2. The traveling information is transmitted via the short-range wireless communication interface unit 15.

At the portable terminal 2, the traveling information having been transmitted from the in-vehicle device 1 is received via the short-range wireless communication interface unit 25 by using the communication function of the sub-application Ms being executed by the control unit 20. The traveling information thus received is then transferred to the application currently running in the foreground. Based upon the traveling information, the application determines the traveling condition of the vehicle and executes processing corresponding to the traveling condition as necessary. For instance, when the vehicle is in a traveling state, it may draw an image different from the image drawn in a stationary state. In addition, it may restrict the use of some functions with the vehicle in a traveling state. By doing this, the action restriction when the vehicle is traveling is imposed in the portable terminal 2. It is to be noted that the contents of the action restriction performed by each application are defined in advance for the respective applications.

Figure 5:
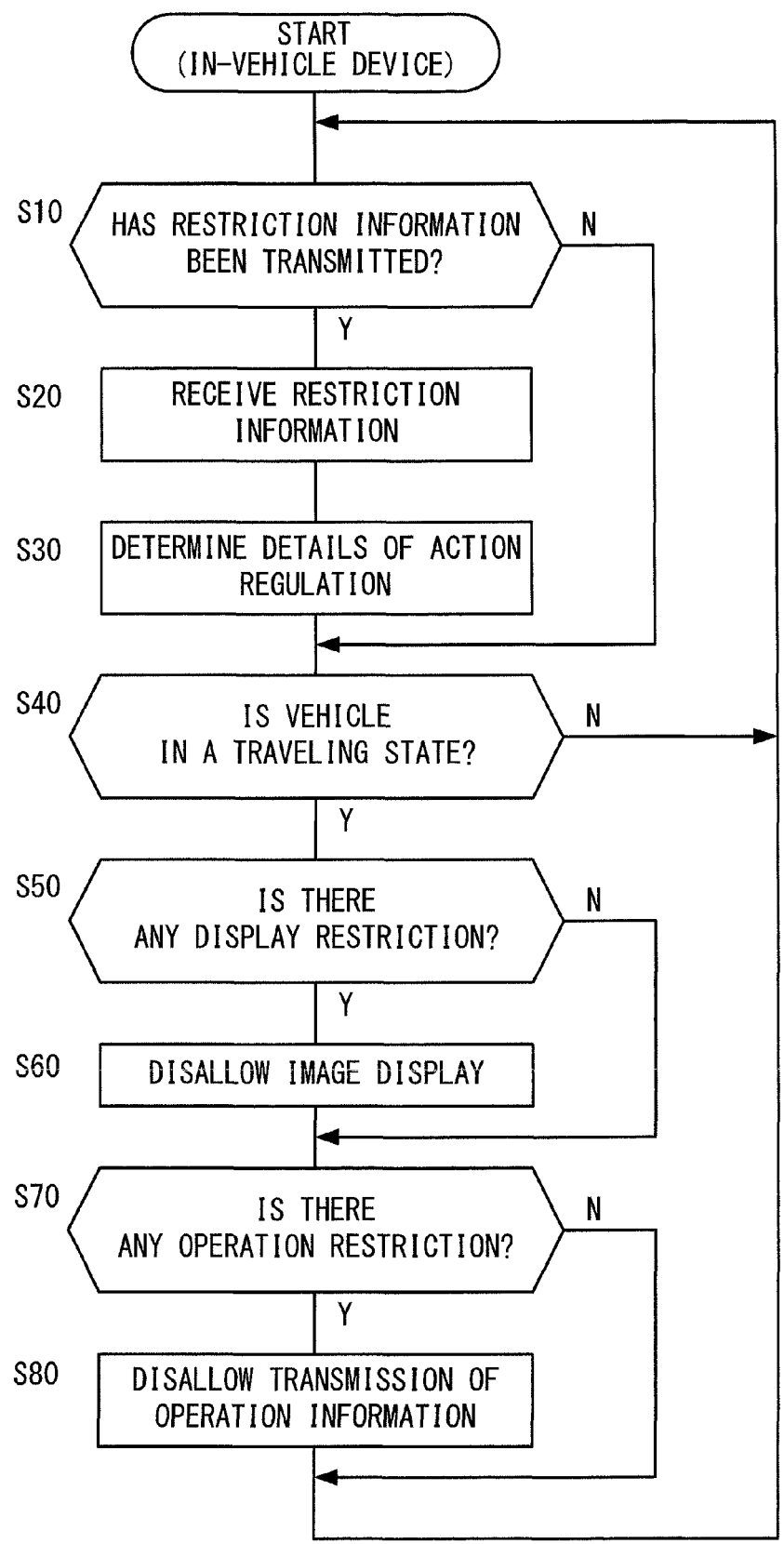
FIG. 5 A flowchart of the processing executed at the in-vehicle device when performing action restriction for applications while the vehicle is in a traveling state.
Figure 6:
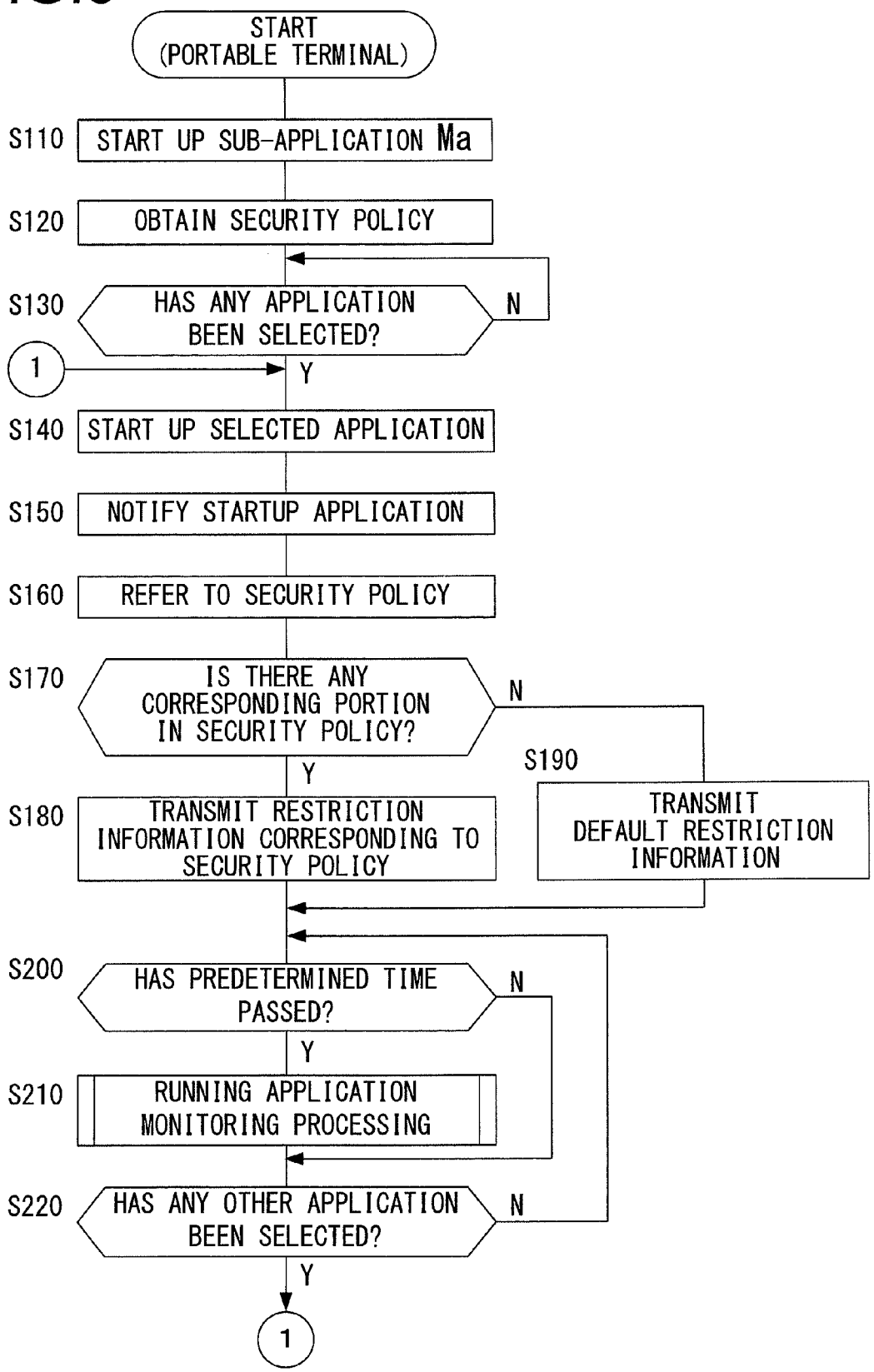
FIG. 6 A flowchart of the processing executed at the portable terminal when performing action restriction for applications while the vehicle is in a traveling state.

FIGS. 5 and 6 each present a flowchart of the processing executed at the in-vehicle device 1 and at the portable terminal 2 when performing action restriction for applications while the vehicle is in a traveling state as explained above.

The flowchart in FIG. 5 is explained first. The processing illustrated in this flowchart is executed by the control unit 10 while communication is established between the in-vehicle device 1 and the portable terminal 2.

Figure 7:
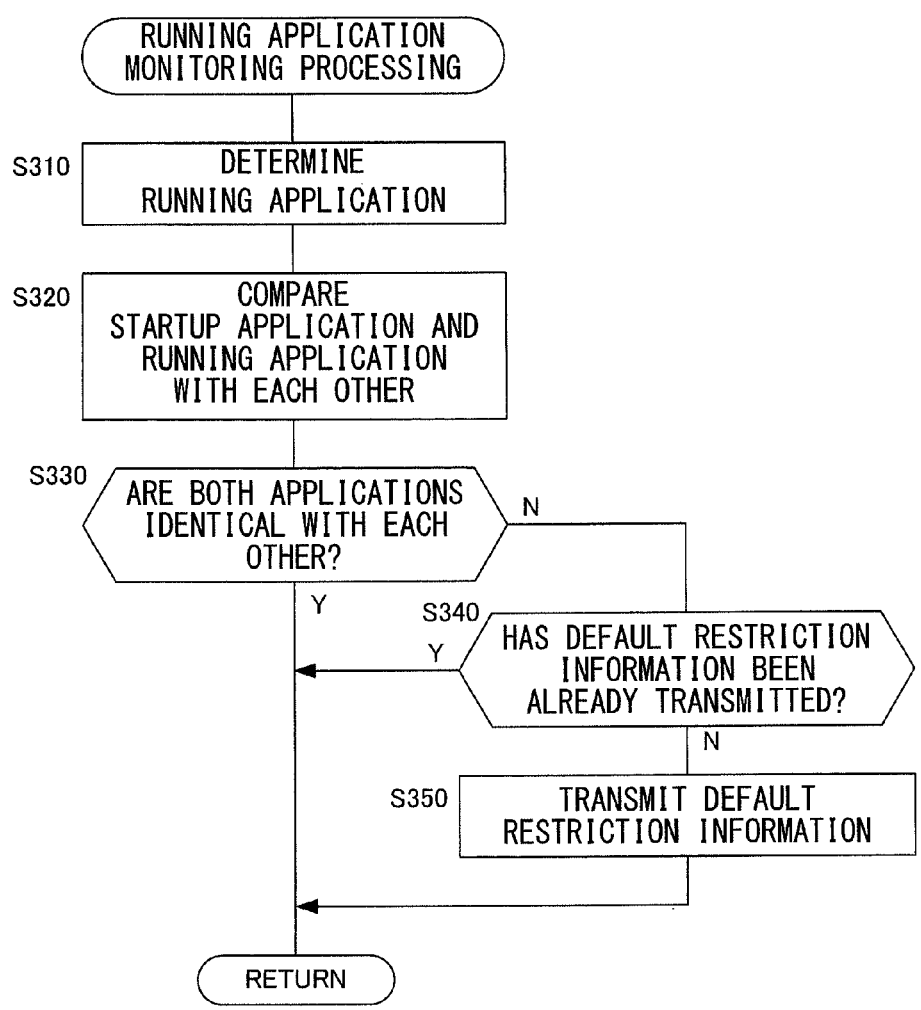
FIG. 7 A flowchart of processing for monitoring a running application.

In step S10, the control unit 10 makes a decision as to whether or not restriction information has been transmitted from the portable terminal 2. The restriction information is transmitted from the portable terminal 2 via the short-range wireless communication interface unit 25 as the processing in step S180 or step S190 in FIG. 6 or the processing in step S350 in FIG. 7 is executed by the control unit 20. If the restriction information has been transmitted, the operation proceeds to step S20 while if the restriction information has not been transmitted, the operation proceeds to step S40.

In step S20, the control unit 10 receives the restriction information transmitted from the portable terminal 2 by using the short-range wireless communication interface unit 15.

In step S30, the control unit 10 determines, based upon the restriction information received in step S20, the contents of the action regulation while the vehicle is in a traveling state, which is imposed on the application being executed at the portable terminal 2. In this step, presence or absence of restrictions imposed on the application for display and operation, respectively.

In step S40, the control unit 10, based upon a vehicle speed signal and a parking signal that are output from the vehicle, makes a decision as to whether or not the vehicle is in a traveling state. If the vehicle is in a traveling state, the operation proceeds to step S50 while if the vehicle is not in a traveling state, the operation returns to step S10.

In step S50, the control unit 10 makes a decision as to whether or not any restriction on display is imposed on the application being executed at the portable terminal 2 based on the result of the determination on the contents of the action regulation in step S30. As a result, if it is decided that the display restriction is present, the operation proceeds to step S60. In this case, in step S60, the control unit 10 disallows display of images by the display unit 11 while the vehicle is in a traveling state. After the processing in step S60 is executed, the operation proceeds to step S70. On the other hand, if it is decided that no display restriction is present, the operation proceeds to step S70 without executing the processing in step S60. In this case, as the processing in S60 is not executed, the control unit 10 allows the display of the images by the display unit 11 while the vehicle is in a traveling state.

In step S70, the control unit 10 makes a decision as to whether or not any restriction on operation is imposed on the application being executed at the portable terminal 2 based on the result of the determination on the contents of the action regulation in step S30. As a result, if it is decided that the operation restriction is present, the operation proceeds to step S80. In this case, in step S80, the control unit 10 disallows transmission of operation information by the short-range wireless communication interface unit 15 while the vehicle is in a traveling state. After the processing in step S80 is executed, the operation returns to step S10. On the other hand, if it is decided that no operation restriction is present, the operation returns to step S10 without executing the processing in step S80. In this case, as the processing in S80 is not executed, the control unit 10 allows the transmission of the operation information by the short-range wireless communication interface unit 15 while the vehicle is in a traveling state.

Subsequently, the flowchart in FIG. 6 is explained. The processing illustrated in this flowchart is executed by the control unit 20 if communication is established between the in-vehicle device 1 and the portable terminal 2 while the sub-application Ms is being executed in the background at the portable terminal 2.

In step S110, the control unit 20 starts up the sub-application Ma. As a result, the sub-application Ma is executed in the foreground and the launch function as described above is realized at the control unit 20. It is to be noted that on this occasion, the sub-application Ms is executed in the background continuously as it is.

In step S120, the control unit 20 obtains the security policy from a predetermined source through regulatory information acquisition function of the sub-application Ma. It then records the security policy into the memory unit 24.

In step S130, the control unit 20 makes a decision as to whether or not any application has been selected by the user at the menu screen image brought up on display at the display unit 11 of the in-vehicle device 1 and the menu screen image brought up on display at the display unit 21 of the portable terminal 2 by using the launch function of the sub-application Ma.

In step S140, the control unit 20 starts up the application selected by the user based upon the result of the decision made in step S130. In this step, the control unit 20 starts execution of the started up application in the foreground instead of the sub-application Ma. On the other hand, the sub-application Ma that has been executed in the foreground is executed in the background.

In step S150, the control unit 20 provides a notification about the application that has been started up in step S140. Through this processing, the started up application is notified from the sub-application Ma to the sub-application Ms and the started up application is recognized at the sub-application Ms.

In step S160, the control unit 20 refers to the security policy obtained in step S120 by the action regulation function of the sub-application Ms.

In step S170, by using the action regulation function of the sub-application Ms, the control unit 20 makes a decision as to whether or not there is in the security policy referred to in step S160 a portion that corresponds to the started up application which is notified in step S150. If there is the corresponding portion, that is, if the contents of the action regulation while the vehicle is in a traveling state for the started up application is described in the security policy, the operation proceeds to step S180. If, on the other hand, such a corresponding portion is absent, that is, if the contents of the action regulation while the vehicle is in a traveling state for the started up application is not described in the security policy, the operation proceeds to step S190.

In step S180, the control unit 20 extracts a portion of the security policy referred to in step S160 corresponding to the started up application, and transmits restriction information appropriate for that portion to the in-vehicle device 1 by using the communication function of the sub-application Ms. As a result, restriction information appropriate for the contents of the action regulation while the vehicle is in a traveling state imposed on the started up application is transmitted to the short-range wireless communication interface unit 15 via the short-range wireless communication interface unit 25. After the processing in step S180 is executed, the control unit 20 causes the operation to proceed to step S200.

In step S190, the control unit 20 transmits predetermined default restriction information to the in-vehicle device 1 by using the communication function of the sub-application Ms. The default restriction information corresponds to the restriction information transmitted when the application D described earlier is started up. In other words, restriction information indicating that both display and operation restrictions which constitute the strictest traveling restrictions are to be imposed on the in-vehicle device 1 is transmitted as the default restriction information. As a result, the predetermined default restriction information as the restriction information appropriate for the contents of the action regulation while the vehicle is in a traveling state imposed on the started up application is transmitted to the short-range wireless communication interface unit 15 of the in-vehicle device 1 via the short-range wireless communication interface unit 25 of the portable terminal 2. After the processing in step S190 is executed, the operation of the control unit 20 proceeds to step S200.

In step S200, the control unit 20 makes a decision as to whether or not a predetermined time has passed since the running application monitoring processing explained later was lastly executed in step S210. If the predetermined time has already passed, the operation proceeds to step S210 whereas if the predetermined time has not yet passed, the operation proceeds to step S220. It is to be noted that in case running application monitoring processing has not been executed, a decision may be made as to whether or not the predetermined time has passed from a time point at which the restriction information was transmitted in step S180 or S190, which serves as a reference.

In step S210, the control unit 20 executes the running application monitoring processing. The running application monitoring processing is to determine which application is currently running at the control unit 20, that is, which application the running application is and monitor whether or not the running application has been started up by using a lunch function, which is a normal start-up procedure. It is to be noted that specific procedure of the running application monitoring processing will be explained later in detail with reference to the flowchart in FIG. 7.

In step S220, the control unit 20 makes a decision as to whether or not any particular application other than the start-up application has been selected at menu screens brought up on display at the display unit 11 of the in-vehicle device 1 and the display unit 21 of the portable terminal 2, respectively, by the launch function of the sub-application Ma. If the particular application other than the start-up application has been selected, the operation returns to step S140, in which the particular application is started up and then the processing in step S150 and subsequent steps is repeated. If, on the other hand, no application other than the start-up application has been selected, the operation returns to step S200. It is to be noted that for instance, by terminating the start-up application or executing it in the background and at the same time executing the sub-application Ma in the foreground again, the control unit 20 can display a menu screen image again to allow an application other than the starting up application to be selected.

FIG. 7 presents a flowchart illustrating the running application monitoring processing that is executed in step S210 in FIG. 6.

In step S310, the control unit 20 determines a running application, i.e., an application that is currently running. In this step, the control unit 20 makes an inquiry to an OS 203 about the running application by using the sub-application Ms. In response to this inquiry, the running application is notified from the OS 203 to the sub-application Ms. This makes it possible to determine the running application by the action regulation function of the sub-application Ms.

In step S320, the control unit 20 compares, by the action regulation function of the sub-application Ms, the start-up application notified in step S150 in FIG. 6 with the running application determined in step S310. In other words, it compares the application started up by the launch function of the sub-application Ma in step S140 with the application that is currently executed at the control unit 20.

In step S330, the control unit 20 makes a decision as to whether or not the start-up application is identical with the running application based upon the results of comparison in step S320. If the start-up application is identical with the running application, the running application monitoring processing illustrated in the flowchart in FIG. 7 is terminated and the operation proceeds to step S220 in FIG. 6. In other words, in this case, the application that is started up by using the launch function, which is a normal start-up procedure, is being executed at the control unit 20, so that it is unnecessary to transmit restriction information anew. For this reason, the running application monitoring processing is terminated without transmitting any restriction information. If, on the other hand, the start-up application is not identical with the running application, the operation proceeds to step S340.

It is to be noted that if, in the decision made in step S330, there are a plurality of running applications that are notified from the OS 203 in step S310 and that include among them the started up application, it is preferred to make a decision that both the applications are identical with each other. In case that a plurality of applications can be executed simultaneously at the control unit 20, this configuration enables the decision in step S330 to be performed correctly.

In step S340, the control unit 20 makes a decision as to whether or not predetermined default restriction information has already been transmitted from the portable terminal 2 to the in-vehicle device 1 by executing the processing in step S190 in FIG. 6. If the default restriction information has already been transmitted it is unnecessary to transmit it again, so that the running application monitoring processing illustrated in the flowchart in FIG. 7 is terminated and the operation proceeds to step S220 in FIG. 6. If, on the other hand, no default restriction information has been transmitted in step S190, the operation proceeds to step S350.

In step S350, the control unit 20, as in step S190 in FIG. 6, transmits default restriction information for indicating both display restrictions and operation restrictions, which constitute the strictest traveling restrictions to the in-vehicle device 1. Through this measure, the predetermined default restriction information as restriction information corresponding to the contents of the action regulation while the vehicle is in a traveling state to be imposed on the running application is transmitted to the short-range wireless communication interface unit 15 of the in-vehicle device 1 via the short-range wireless communication interface unit 25 of the portable terminal 2. After the processing in step S350 is executed, the running application monitoring processing illustrated in the flowchart in FIG. 7 is terminated and the operation proceeds to step S220 in FIG. 6. It is to be noted that by omitting the processing in step S340, the processing in step S350 may be executed to transmit default restriction information even if the default restriction information has already been transmitted.

By executing the running application monitoring processing explained earlier for each predetermined time, the control unit 20 can determine the running application and compare it with the start-up application for each predetermined time and transmit restriction information based on the results of the comparison to the in-vehicle device 1.

According to the embodiment explained above, operations and advantageous effects (1) through (7) can be obtained.

(1) In an in-vehicle information system, the portable terminal 2 determines, for each predetermined time, an application that is executed at the control unit 20 by the processing at the control unit 20 (step S310). Then, the start-up application, that is, the application that is started up by the launch function of the sub-application Ma and the running application determined in step S310 are compared with each other (step S320) and based upon the results of this comparison the portable terminal 2 transmits restriction information corresponding to the contents of the action regulation while the vehicle is in a traveling state to be imposed on the running application to the in-vehicle device 1 (step S350). Through these measures, when the portable terminal 2 is connected to the in-vehicle device 1 while the vehicle is in a traveling state to allow the application installed to be executed at the portable terminal 2 and output images and sounds from the in-vehicle device 1, the safety of driving can be assured.

(2) The control unit 20 obtains a security policy as regulatory information indicating contents of action regulation while the vehicle is in a traveling state to be imposed on each predetermined application (step S120). Then, before comparison is made between the start-up application and the running application in step S320, the control unit 20 transmits, to the in-vehicle device 1, restriction information corresponding to the contents of the action regulation while the vehicle is in a traveling state to be imposed on the start-up application based upon the security policy obtained in step S210 (step S180). In addition, after comparison is made between the start-up application and the running application in step S320 and based upon the results of this comparison, the control unit 20 transmits, to the in-vehicle device 1, restriction information corresponding to the contents of the action regulation while the vehicle is in a traveling state to be imposed on the running application in step S350. Through this measure, as an application starts up, restriction information appropriate for the application can be transmitted from the portable terminal 2 to the in-vehicle device 1. In addition, when any particular application different from the application that has been started up by using the launch function, which is a normal start-up procedure, is being executed, restriction information appropriate for the particular application can be transmitted from the portable terminal 2 to the in-vehicle device 1.

(3) Based upon the results of comparison in step S320, the control unit 20 makes a decision as to whether or not the start-up application and the running application are identical with each other (step S330). As a result, if it is decided that the start-up application and the running application are not identical with each other, the control unit 20 in step S350 transmits, to the in-vehicle device 1, predetermined default restriction information as restriction information corresponding to the contents of the action regulation while the vehicle is in a traveling state to be imposed on the running application. Through these measures, when a particular application different from the application that has been started up by using the launch function, which is a normal start-up procedure, is being executed, the control unit 20 can indicate the strictest traveling regulation to the in-vehicle device 1 regardless of the contents of the security policy on the particular application.

(4) If, on the other hand, it is decided as a result of the decision in step S330 that the start-up application and the running application are identical with each other, the control unit 20 does not transmit restriction information without executing the processing in step S350. As unnecessary transmission of restriction information is disallowed in this manner, it is possible to reduce load of processing and load of communication.

(5) The portable terminal 2 outputs, via its video/audio signal output unit 26, an image corresponding to the application currently being executed in the foreground by the control unit 20 to the in-vehicle device 1. On the other hand, the in-vehicle device 1, along with displaying the image output from the portable terminal 2 at the display unit 11, receives an input of a user operation via the operation unit 12 and then transmits operation information corresponding to the user operation via the short-range wireless communication interface unit 15 to the portable terminal 2. On this occasion, the in-vehicle device 1, through the processing by the control unit 10, allows or disallows the display of an image by the display unit 11 and the transmission of operation information by the short-range wireless communication interface unit 15, respectively, while the vehicle is in a traveling state based upon the restriction information transmitted from the portable terminal 2 (steps S30 through S80). Through these measures, adverse effects on driving caused by outputting at the in-vehicle device 1, images and sounds generated by the application running at the portable terminal 2.

(6) As the control unit 20 realizes a launch function by executing the sub-application Ma having the launch function (step S110), the launch function can be realized with certainty.

(7) Along with executing the sub-application Ma in the foreground, the control unit 20 executes the sub-application Ms having an action regulation function for performing comparison in step S320 and a communication function for transmitting restriction information to the in-vehicle device 1 in step S180, S190 or S350 in the background. Through these measures, various functions of the control unit 20 can be appropriately realized in a shared manner.

It is to be noted that in the embodiment explained above, if it is decided that the start-up application and the running application are identical with each other in step S330 in FIG. 7, the running application monitoring processing is terminated and no restriction information is transmitted. However, in this case too, similarly to step S180 or S190 in FIG. 6, the restriction information may be transmitted. In other words, if the contents of the action regulation while the vehicle is in a traveling state to be imposed on the running application is described in the security policy, the restriction information corresponding to the contents is transmitted to the in-vehicle device 1 in the same manner as that in step S180. If, on the other hand, the contents of the action regulation while the vehicle is in a traveling state to be imposed on the running application is not described in the security policy, default restriction information indicating the strictest traveling regulation to the in-vehicle device 1 is transmitted to the in-vehicle device 1 in the same manner as that in step S190. Through these measures, before the comparison between the start-up application and the running application is performed, the restriction information transmitted in step S180 or S190 is transmitted to the in-vehicle device 1 again.

In the embodiment described above, transmission of video signals and audio signals from the portable terminal 2 to the in-vehicle device 1 is enabled by connecting the in-vehicle device 1 and the portable terminal 2 with each other via the video/audio cable 3. In addition, the in-vehicle device 1 and the portable terminal 2 communicate with each other through short-range wireless communication carried out in compliance with a predetermined communication standard such as Bluetooth in the embodiment described above. However, the present invention is not limited to these examples and may be adopted in conjunction with another communication method or another signal transmission method. For instance, video signals and audio signals originating from the portable terminal 2 may be transmitted to the in-vehicle device 1 through wireless communication. In addition, communication between the in-vehicle device 1 and the portable terminal 2 may be carried out through wired communication such as USB communication. In other words, the present invention may be adopted in conjunction with any communication method as long as it allows the in-vehicle device 1 and the portable terminal 2 to exchange necessary signals and information.

It is to be noted that various types of vehicle information output from the vehicle other than the vehicle speed signal and the parking signal may also be obtained by the in-vehicle device 1 in the embodiment described above. Such vehicle information taken into the in-vehicle device 1 may then be utilized in processing executed in the in-vehicle device 1, or it may be output from the in-vehicle device 1 to the portable terminal 2 and used in processing executed at the portable terminal 2. For instance, a start-up condition indicated by such vehicle information may be set in advance in correspondence to each application and when vehicle information indicating a specific start-up condition is output from the vehicle, the corresponding application may be started up automatically at the portable terminal 2. Information indicating the start-up conditions for the individual applications may be transmitted from the portable terminal 2 to the in-vehicle device 1 and a decision as to whether or not a start-up condition is satisfied may be made in the in-vehicle device 1 based upon the vehicle information. As an alternative, the vehicle information may be transmitted from the in-vehicle device 1 to the portable terminal 2 and the decision as to whether or not a start-up condition is satisfied may be made at the portable terminal 2 based upon the vehicle information. Such use of vehicle information makes it possible for the portable terminal 2 to automatically start-up an application that, for instance, enables a search for gas stations located near the current position when vehicle information, indicating that the quantity of remaining fuel in the vehicle has become less than a predetermined quantity, is output from the vehicle.

In the embodiment described above, button information indicating the contents of a button operation performed by the user or coordinate information indicating the position on the screen specified through a touch panel operation is transmitted as operation information from the in-vehicle device 1 to the portable terminal 2 and the portable terminal 2 then determines the contents of the user operation based upon the operation information. However, the present invention is not limited to this example and the in-vehicle device 1 may instead determine the contents of the user operation and then transmit an application start-up command or an application end command to the portable terminal 2 based upon the user operation contents thus determined.

Figure 8:
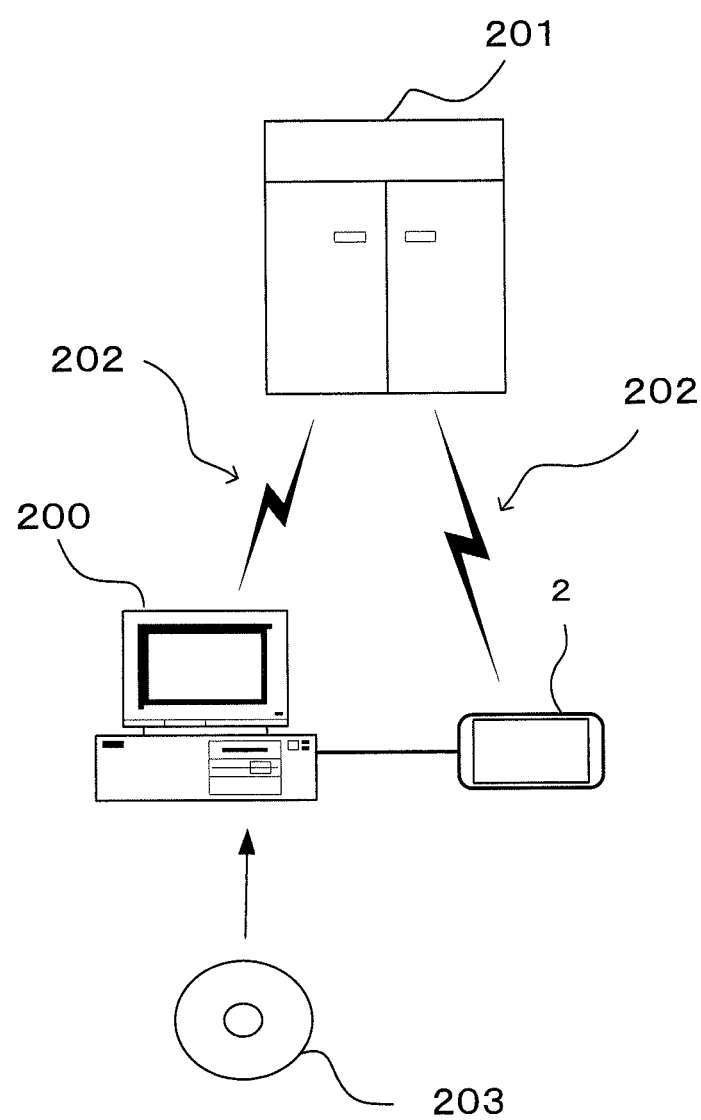
FIG. 8 A diagram illustrating how a program may be provided to a portable terminal.

It is to be noted that a program fulfilling the functions of the application manager achieved in the embodiment described above may be provided to the portable terminal 2 in a recording medium such as a CD-ROM or through an electric communication line such as the Internet. FIG. 8 shows how such a program may be provided. A personal computer 200, which is connected with the portable terminal 2, provides the application manager program made available from a server apparatus 201 via a communication line 202 or from a CD-ROM 203 to the portable terminal 2. In addition, the application manager program available at the server apparatus 201 may be directly provided to the portable terminal 2 through the communication line 202 by bypassing the personal computer 200. The communication line 202 may be the Internet, a communication network for personal computer communication or the like, a dedicated communication line, a portable telephone network or the like. The server 201 transmits the application manager program to the personal computer 200 or the portable terminal 2 via the communication line 202. Namely, the program converted to a data signal on a carrier wave is transmitted via the communication line 202. In other words, the application manager program, which can be executed at the portable terminal 2, may be provided as a computer-readable program product assuming any of various modes including a recording medium and a carrier wave.

The embodiment and variations thereof described above simply represent examples and as long as features characterizing the present invention remain intact, the present invention is in no way limited to the particulars of the embodiment and variations. In addition, the embodiment and the variations thereof may be adopted in any combination.

The disclosure of the following priority application is herein incorporated by reference: Japanese Patent Application No. 2012-124543 (filed on May 31, 2012).

REFERENCE SIGNS LIST

1: in-vehicle device, 2: portable terminal, 3: video/audio cable, 10: control unit, 11: display unit, 12: operation unit, 13: sound output unit, 14: memory unit, 15: short-range wireless communication interface unit. 16: video/audio signal input unit, 20: control unit, 21: display unit, 22: operation unit, 23: sound output unit, 24: memory unit, 25: short-range wireless communication interface unit, 26: video/audio signal output unit, 27: wireless communication unit, 28: GPS receiver unit.

The invention claimed is:

1. An in-vehicle information system including a portable information terminal and an in-vehicle device, wherein the portable information terminal comprises:
 a storage unit that stores a plurality of applications;
 a control unit that has a launch function to start-up any one of the plurality of applications stored in the storage unit and executes an application started up by the launch function in a foreground;
 a running application determination unit that determines an application that is executed by the control unit by a predetermined time interval;
 a comparison unit that compares a start-up application that is started up by the launch function and a running application that is determined by the running application determination unit;
 a restriction information transmission unit that transmits to the in-vehicle device restriction information corresponding to contents of action regulation imposed on the running application while a vehicle is in a traveling state based upon a result of the comparison by the comparison unit;
a regulatory information acquisition unit that obtains regulatory information indicating contents of action regulation imposed on each predetermined application while the vehicle is in a traveling state, wherein
before the comparison unit performs the comparison, the restriction information transmission unit transmits to the in-vehicle device the restriction information corresponding to the contents of the action regulation imposed on the start-up application while the vehicle is in a traveling state based on the regulatory information,
after the comparison unit performs the comparison, the restriction information transmission unit transmits to the in-vehicle device the restriction information corresponding to the contents of the action regulation imposed on the running application while the vehicle is in a traveling state based upon the result of the comparison, and
the restriction information transmission unit decides whether or not to transmit the restriction information to the in-vehicle device based on whether or not the running application is identical to the start-up application started up by the launch function.

2. An in-vehicle information system according to claim 1, further comprising
a decision-making unit that makes a decision as to whether or not the start-up application and the running application are identical with each other, wherein
if it is decided by the decision-making unit that the start-up application and the running application are not identical with each other, the restriction information transmission unit transmits, to the in-vehicle device, predetermined default restriction information as the restriction information corresponding to the contents of the action regulation imposed on the running application while the vehicle is in a traveling state.

3. An in-vehicle information system according to claim 2, wherein
if it is decided by the decision-making unit that the start-up application and the running application are identical with each other, the restriction information transmission unit transmits, to the in-vehicle device, a same restriction information as that which was transmitted before the comparison was made by the comparison unit again or the restriction information transmission unit does not transmit the restriction information.

4. An in-vehicle information system according to claim 1, wherein:
the information terminal further comprises an image output unit that outputs an image corresponding to the application being executed by the control unit in the foreground to the in-vehicle device;
the in-vehicle device further comprises:
a display unit that displays the image output from the information terminal;
an operation input unit that inputs an operation by a user; and
an operation information transmission unit that transmits to the information terminal operation information corresponding to the operation inputted through the operation input unit; and
based upon the restriction information transmitted from the information terminal by the restriction information transmission unit, the in-vehicle device allows or disallows the display of the image by the display unit and the transmission of the operation information by the operation information transmission unit respectively.

5. An in-vehicle information system according to claim 1, wherein
the control unit realizes the launch function by executing a first sub-application having the launch function.

6. An in-vehicle information system according to claim 5, wherein
the control unit, along with executing the first sub-application in the foreground, executes in a background a second sub-application having an action regulation function for performing the comparison by the comparison unit and a communication function for transmitting the restriction information by the restriction information transmission unit to the in-vehicle device.

7. An information terminal comprising:
a storage unit that stores a plurality of applications;
a control unit that has a launch function to start-up any one of the applications stored in the storage unit and executes an application started up by the launch function in a foreground;
a running application determination unit that determines an application that is executed by the control unit by a predetermined time interval;
a comparison unit that compares a start-up application that is started up by the launch function and a running application that is determined by the running application determination unit;
a restriction information transmission unit that transmits to the in-vehicle device restriction information corresponding to contents of action regulation imposed on the running application while a vehicle is in a traveling state based upon a result of the comparison by the comparison unit; and
a regulatory information acquisition unit that obtains regulatory information indicating contents of action regulation imposed on each predetermined application while the vehicle is in a traveling state, wherein
before the comparison unit performs the comparison, the restriction information transmission unit transmits to the in-vehicle device the restriction information corresponding to the contents of the action regulation imposed on the start-up application while the vehicle is in a traveling state based on the regulatory information,
after the comparison unit performs the comparison, the restriction information transmission unit transmits to the in-vehicle device the restriction information corresponding to the contents of the action regulation imposed on the running application while the vehicle is in a traveling state based upon the result of the comparison, and
the restriction information transmission unit decides whether or not to transmit the restriction information to the in-vehicle device based on whether or not the running application is identical to the start-up application started up by the launch function.

8. A method of executing an application by using an in-vehicle information system including a portable information terminal and an in-vehicle device, the method comprising:
storing in advance a plurality of applications at the portable information terminal;
determining a running application being executed at the information terminal by a predetermined time interval;

making a comparison between a start-up application that is started up by a predetermined launch function at the information terminal and the determined running application;

transmitting, based upon a result of the comparison, restriction information corresponding to contents of action regulation imposed on the running application while a vehicle is in a traveling state from the information terminal to the in-vehicle device; and obtaining, via a regulatory information acquisition unit, regulatory information indicating contents of action regulation imposed on each predetermined application while the vehicle is in a traveling state, wherein before the comparison unit performs the comparison, the restriction information transmission unit transmits to the in-vehicle device the restriction information corresponding to the contents of the action regulation imposed on the start-up application while the vehicle is in a traveling state based on the regulatory information, after the comparison unit performs the comparison, the restriction information transmission unit transmits to the in-vehicle device the restriction information corresponding to the contents of the action regulation imposed on the running application while the vehicle is in a traveling state based upon the result of the comparison, and the restriction information transmission unit decides whether or not to transmit the restriction information to the in-vehicle device based on whether or not the running application is identical to the start-up application started up by the launch function.

* * * * *